Sept. 23, 1958  F. H. MUELLER ET AL  2,852,967
ROTATABLE POWER DRIVEN TOOL

Filed Feb. 16, 1956  3 Sheets-Sheet 1

INVENTORS:
Frank H. Mueller,
John J. Smith,
BY Cushman, Darby & Cushman
ATTORNEYS.

Sept. 23, 1958    F. H. MUELLER ET AL    2,852,967
ROTATABLE POWER DRIVEN TOOL
Filed Feb. 16, 1956    3 Sheets-Sheet 2
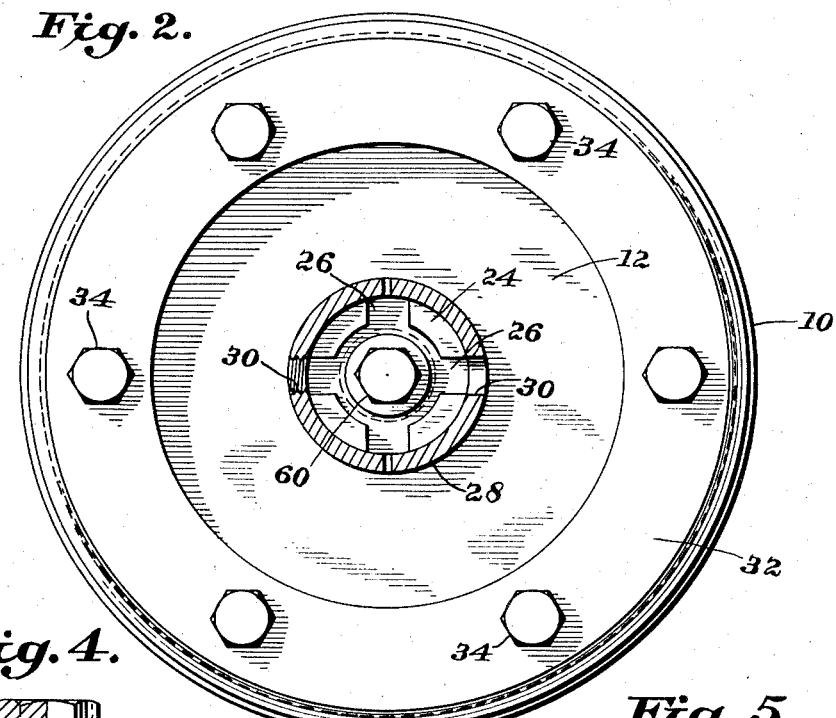
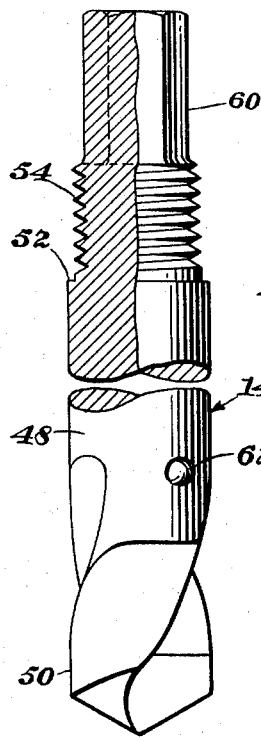
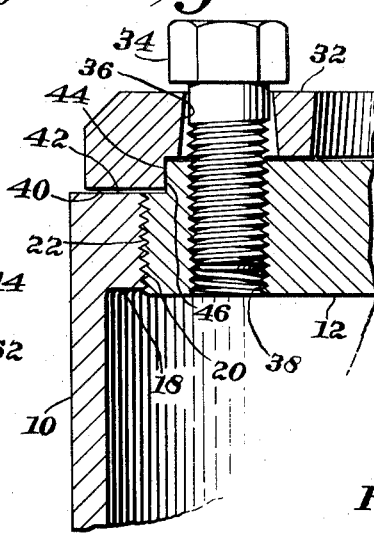
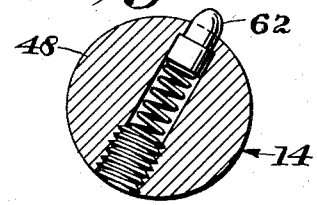
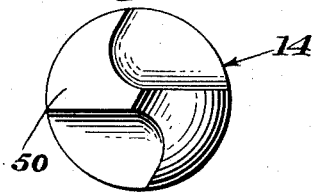
INVENTORS:
Frank H. Mueller,
John J. Smith,
BY Cushman, Darby & Cushman
ATTORNEYS.

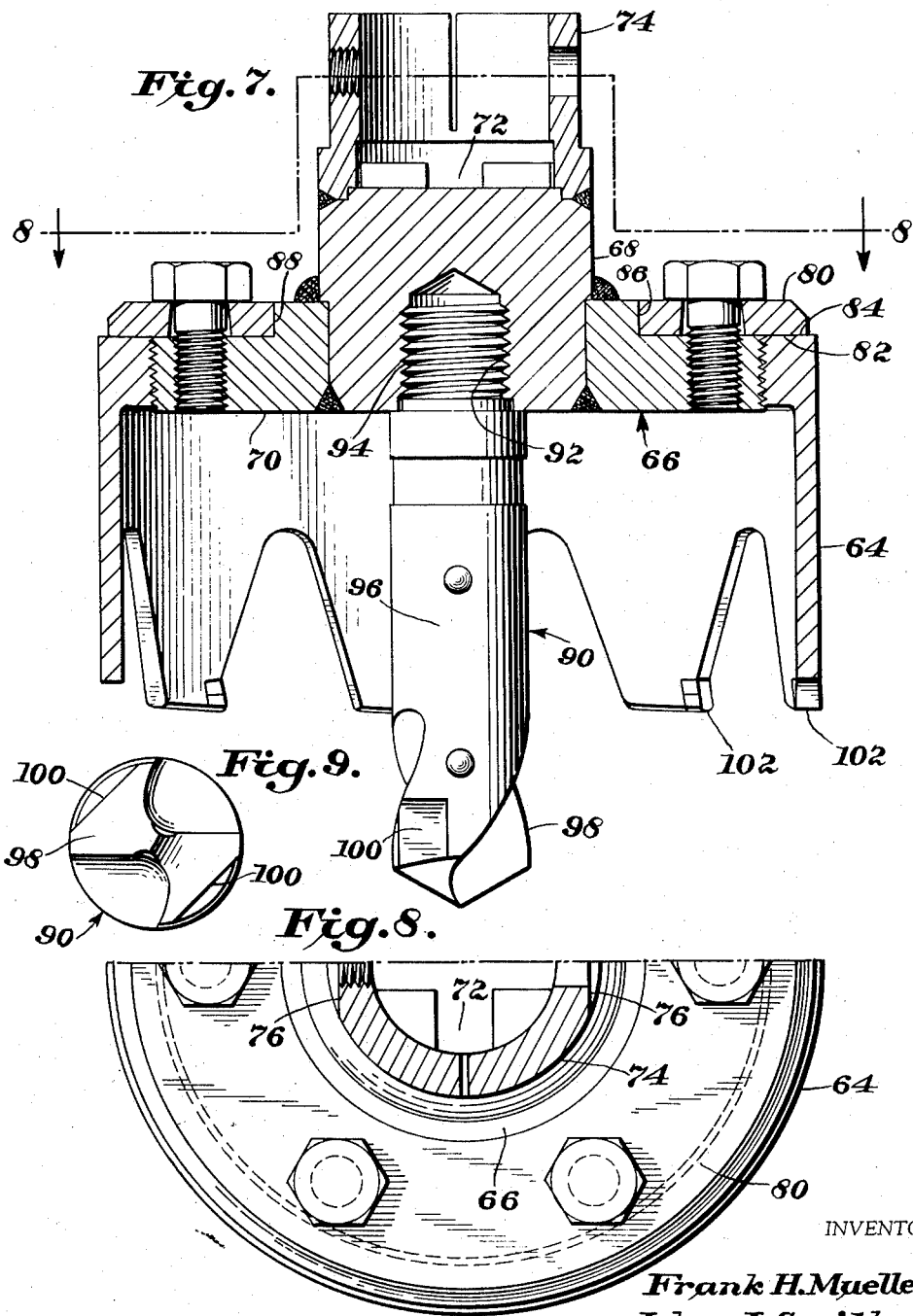

United States Patent Office 2,852,967
Patented Sept. 23, 1958

2,852,967
ROTATABLE POWER DRIVEN TOOL

Frank H. Mueller and John J. Smith, Decatur, Ill., assignors to Mueller Co., Decatur, Ill., a corporation of Illinois Application February 16, 1956, Serial No. 566,027

13 Claims. (Cl. 77—69)

This invention relates to a rotatable power driven tool, and more particularly to improvements in tools of this nature having a work-engaging part that is threadedly connected to a rotatable driving part. Although the invention herein will be described and illustrated with reference to a shell cutter assembly, it will be realized that the invention is applicable to other types of power driven rotatable tools.

Power driven rotatable tools, and especially those designed for metal working, frequently consist of a work-engaging part, having cutting edges, that is threadedly connected to a driving part which is adapted to be detachably, or is permanently, connected to a source of power, e. g., a boring bar or other type of driving shaft. The threaded connection between the two parts of the tool not only enables ready replacement of the work-engaging part by a part of different size or type, but also enables ready detachment of the work-engaging part for repair or replacement by an identical part.

The threads connecting the two parts of the aforedescribed type of tool normally are of such a direction that driving the work-engaging part, while engaged with the work, by the driving part serves to tighten the threaded connection therebetween. In many instances, particularly in tools of large size, the load or torque imposed upon the tool is so great that the aforedescribed threaded connection becomes so tight that it is extremely difficult to loosen the same without the possibility of damage to either or both parts of the tool. Thus, for example, a shell cutter assembly, which is employed to cut an annular hole, normally comprises two parts, namely, a shell cutter and a hub. The hub and the shell cutter are joined by a threaded connection, and in the larger size shell cutters, e. g., those of a size to cut annular holes having a diameter of the order of 8 inches and up, such threaded connection becomes so tight that it is difficult to loosen the same without marring or scoring the outer smooth cylindrical surface of the shell cutter or damaging its cutting teeth.

Accordingly, it is an object of this invention to provide tools of the type under consideration with means for facilitating the disengagement of the threaded connection between the two parts of the tool, such means being both simple in design, with consequent manufacturing economies, and easy to operate.

Shell cutter assemblies also frequently have a pilot drill that is detachably connected to the hub assembly. Prior constructions, however, of the detachable connection between the pilot drill and the hub of a shell cutter assembly either do not firmly and rigidly secure the drill to the hub or else embody constructions wherein the smooth, cylindrical surface of the drill becomes marred by the application of a wrench thereto during the disassembly of the drill from the hub.

Consequently, it is another object of this invention to provide a threaded connection between a pilot drill and the hub of a shell cutter assembly and further to provide the pilot drill with means for facilitating the connection and disconnection thereof from the hub without damage to the drill or to the shell cutter of the shell cutter assembly.

Other objects and advantages of the invention will become apparent from the following description and accompanying drawings, in which:

Figure 2 is a transverse, sectional view taken substantially on line 2—2 of Figure 1;

Figure 3 is an enlarged, fragmentary view of a portion of Figure 1 illustrating the loosened condition of the parts for facilitating disconnection of the shell cutter from the hub;

Figure 4 is an enlarged side view, partly in section, of the pilot drill shown in Figure 1;

Figure 5 is an enlarged sectional view taken substantially on line 5—5 of Figure 1;

Figure 6 is an end view of the work-engaging end of the pilot drill shown in Figure 4;

Figure 7 is a view corresponding to Figure 1 but showing a slightly modified form of the invention;

Figure 8 is a fragmentary, transverse, sectional view taken substantially on line 8—8 of Figure 7; and Figure 9 is an end view of the work-engaging end of the pilot drill shown in Figure 7.

Figure 1:
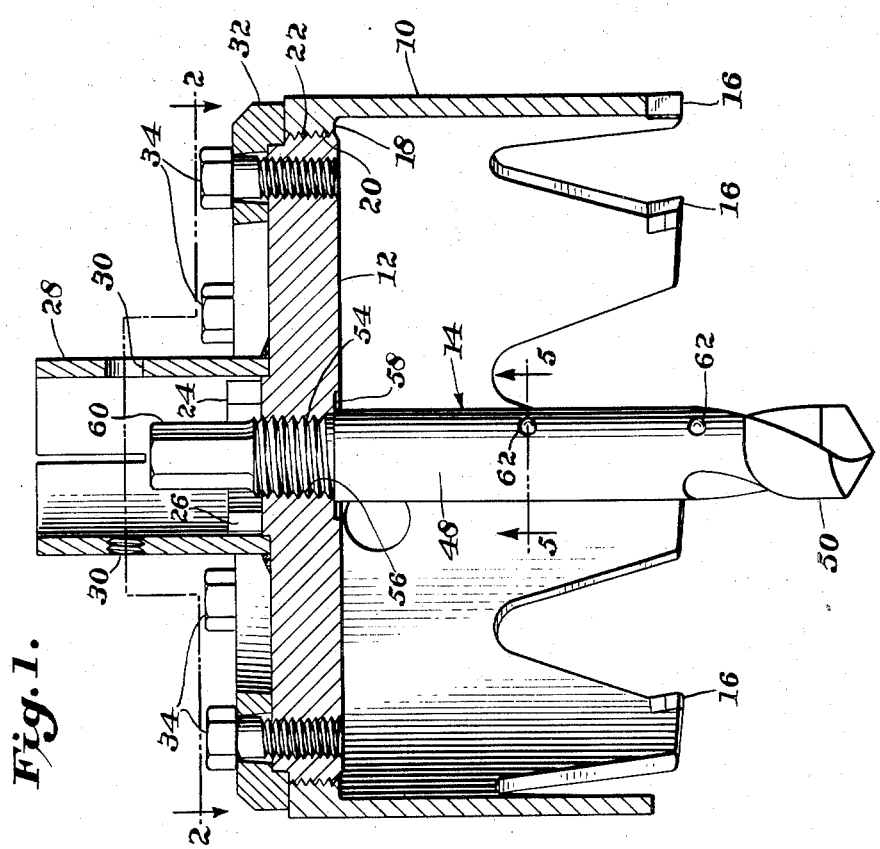
Figure 1 is a longitudinal, sectional view through a shell cutter assembly embodying this invention.

Referring now to Figures 1 to 6 of the drawings, there is shown a shell cutter assembly embodying this invention. The assembly essentially consists of a shell cutter 10, a hub 12, and a pilot drill 14. The shell cutter 10 is of substantially conventional construction, being in the form of an open-ended, hollow cylinder provided at its forward end with work-engaging teeth 16. For substantially the major portion of its axial length, the wall thickness of the shell cutter 10 is constant, but at its rearward end the shell cutter is interiorly enlarged, as at 18, and such interiorly enlarged portion is provided throughout its entire length with an interior thread 20. The hub 12 of the shell cutter assembly is of circular plate-like construction, i. e., disc-shaped, provided on its outer periphery with an exterior thread 22 complementary to and engaged with the interior thread 20 on the shell cutter 10. On its rearward face, the hub 12 is provided with a central, annular boss 24 having a plurality of slots 26 therein spaced at 90° intervals for the reception of complementary prongs on the end of a boring bar (not shown). Coaxially surrounding the boss 24, and secured to the hub 12, as by welding, is a sleeve 28, of somewhat greater axial length than the boss. The sleeve 28 is adapted to surround the lower end of the aforementioned boring bar and has a pair of diametrically disposed apertures 30, one of which may be threaded, as shown, for the reception of a locking pin or screw (not shown), adapted to extend through the unthreaded aperture through a transverse aperture in the boring bar and into threaded engagement in the threaded aperture of the sleeve. Obviously, such a locking pin or screw serves to detachably secure the entire shell cutter assembly on the end of a boring bar. The direction of the threads 20 and 22 is such that when the assembly is driven to cut a hole, the thread engagement is tightened.

In many shell cutters of the above-described type presently in use, the outer periphery of the hub is enlarged immediately rearwardly of its thread to provide a forwardly-facing shoulder which overlies the rearward end of the shell cutter. Hence, when the shell cutter is threaded onto the hub, the engagement between the aforementioned hub shoulder or stop and the rearward end of the shell cutter serves to retain the latter in place on the hub. In order to avoid the aforedescribed disadvantage, however, i. e., of the engagement between the threads becoming so tight that it is very difficult to disengage the shell cutter from the hub without the probability of damaging the smooth interior and exterior surfaces of the cutter, or of damaging the teeth thereof, this invention provides releasable stop means for limiting the extent of engagement of the threads securing the hub and cutter together. Hence, by releasing such stop means, tight threads can be readily loosened.

For this purpose, an annular ring 32 is detachably connected to the rearward face of the hub 12, as by a plurality of circumferentially-spaced cap screws 34 extending freely through unthreaded apertures 36 in the ring and into tapped holes 38 in the hub, as best shown in Figure 3. The outer peripheral portion of the ring 32 extends radially outwardly beyond the major radial dimension of the hub 12 and such portion is provided with a flat under or forward stop surface 40 for engagement with the rearward end or face 42 of the shell cutter 10. Consequently, when the shell cutter 10 is connected to the hub 12, by screwing the former onto the thread 22 of the latter, the engagement between the ring face 40 and the cutter rearward end or face 42 locks the cutter securely in place on the hub, so that the shell cutter can be driven by the boring bar. In this connection, it will be noted that the major diameter of the ring 32 is slightly less than that of the shell cutter 10, so that the entire shell cutter assembly can pass freely and completely through a hole cut by the shell cutter.

Preferably, means are provided to readily center the back-up ring 32 on the hub 12 to facilitate proper assembly of these parts and registration of the ring apertures 36 with the hub apertures 38. For this purpose, the hub 12 is somewhat reduced in diameter rearwardly of its thread 22, i. e., provided with a circumferential recess at its outer rearward edge, and the ring 32 is provided with a corresponding flange portion that is complementary to and fits within such recess. By this construction, the hub may have an outer smooth cylindrical surface 44, of somewhat smaller diameter than that of the hub thread 22, while the ring 32 may have a smooth inner cylindrical surface 46 that fits relatively snugly over the hub surface 44. Consequently, when the ring 32 is placed upon the hub 12, it can be manipulated until the outer flange portion of the ring fits within the circumferential recess of the hub. Thereupon, the ring 32 can be rotated relative to the hub 12 until the apertures 36 and 38 in the ring and in the hub, respectively, are aligned, whereupon the cap screws 34 can be inserted readily and then tightened to firmly secure the back-up ring in place on the hub.

As described above when the shell cutter assembly is employed to cut a hole in a plate or in a pipe, the threaded connection between the hub 12 and the shell cutter 10 will become extremely tight, because the cutter face 42 will become jammed against the ring stop face 40. When it is desired to detach the shell cutter 10 from the hub 12, however, it will be seen that by merely loosening the screws 34, as is shown in Figure 3, the ring 32 will back off slightly to disengage the stop surfaces 40 and 42, and thereby permit the cutter to be unscrewed easily from the hub with very little effort. Consequently, there will be no need to employ any wrench means on the shell cutter which might possibly damage its smooth exterior or interior surfaces, or its teeth 16.

The pilot drill 14 of the shell cutter assembly projects forwardly beyond the cutter teeth 16 for centering and stabilizing purposes, as is common in the art, and has a cylindrical shank 48 and a forward cutting tip 50. Adjacent its rearward end, the shank 48 of the pilot drill 14 is reduced to form a rearwardly facing shoulder 52 (Figure 4), and rearwardly of such shoulder the shank is threaded, as at 54, for engagement with a complementary interior thread 56 in an aperture extending centrally through the hub 12. On its forward face, the hub is provided with a shallow counterbore 58 coaxial with the thread 56 to form a forwardly facing shoulder for engagement by the shoulder 52 on the pilot drill 14. Rearwardly of its threaded portion 54, the drill 14 projects beyond the hub 12 and within the sleeve 28 wherein the drill has a hexagonal or other non-circular configuration, as at 60, for engagement by an appropriate wrench (not shown). Preferably, the shank 48 of the drill 14 is provided with two longitudinally-spaced, spring-pressed, coupon-retaining detents 62 identical to and for the same purposes as those described in our copending application Serial No. 515,282, filed June 14, 1955, now Patent No. 2,800,812, dated July 30, 1957.

It will be seen that the overall area of frictional engagement between the drill threads 54 and the corresponding hub threads 56 is considerably less than that of the hub and shell cutter threads 22 and 20. Consequently, the torque required to loosen the pilot drill 14 from the hub 12 is vastly less than that required, in the absence of this invention, to loosen the shell cutter 10 from the hub 12. Therefore, it usually is unnecessary to apply this invention to the threaded connection between the pilot drill 14 and the hub 12.

Referring now to Figures 7 to 9 of the drawings, there is shown a somewhat modified form of the invention. In this embodiment, the shell cutter 64 is of substantially the same construction as that shown in Figure 1, but the hub 66 is of somewhat different construction from that shown in Figure 1. Thus, the central portion of the hub 66 has an axially enlarged portion 68, and this configuration may be achieved by forming the hub from a length of bar stock having a ring-like portion 70 secured thereto, as by welding. As in the embodiment shown in Figure 1, the hub 66 is provided with notches 72 for interlocking engagement with corresponding prongs on the end of a boring bar (not shown) and with a boring bar enclosing sleeve 74. For reasons later described, the sleeve 74 is provided with exterior flat portions 76 (Figure 8) for engagement by a wrench (not shown).

The hub-attached back-up ring 80 of this embodiment has an underside or surface that is flat throughout its entire radial extent for fitting against a complementary flat surface on the rearward face 84 of the cutter 64. As in the embodiment shown in Figure 1, the rearward face of the hub 66 is provided with a circumferential recess but of sufficient radial extent so as to completely receive the entire inner peripheral portion of the back-up ring 80 and with the inner wall 86 of such recess being of substantially the same diameter as that of the inner diameter of the ring. Consequently, the ring inner surface 88 and the inner wall 86 of the recess provide concentric complementary surfaces that serve to center the ring 80 on the hub 66 for assembly purposes as described heretofore. In this connection, however, it will be realized that the complementary centering surfaces of either of the above-described embodiments need not be cylindrical, but could be conical or conoidal and perform the same function.

For the purpose of connecting a pilot drill 90 to the hub 66, the forward face of the latter is provided with a coaxial interiorly-threaded socket 92 for the reception of the complementarily-threaded rearward end 94 of the drill. In order to avoid marring the smooth outer surface of the drill shank 96 or the edges of the drill tip 98, by the application of a wrench thereto for the purpose of disassembling the drill 90 from the hub 66, the peripheral surface of the drill tip is provided with diametrically disposed, flat portions 100 which readily can be engaged by a wrench (not shown) without marring the smooth outer surfaces or cutting edges of the drill. It also will be noted that the drill 90, as is conventional, extends forwardly beyond the plane of the cutting teeth 102 of the shell cutter 64, and that the flat portions 100 on the drill are disposed forwardly beyond such plane, so that a wrench, when applied to the flat portions 100, will not interfere with the teeth of the shell cutter. It also will be noted that the flats 76 on the sleeve 74 of the hub 66 are engageable by another wrench (not shown) to facilitate the assembly and disassembly of the pilot drill 90 with and from the hub without danger of marring the smooth outer cylindrical surfaces of the cutter 64.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed wtihin the spirit and scope of the following claims.

We claim:

1. In a power-driven rotatable tool, the combination comprising: a work-engaging driven part rotatable about an axis; a thread on said part coaxial with said axis; a rotatable driving part; a thread on said driving part complementary to and engageable with said driven part thread for detachably securing said parts together, said threads being of a direction to tighten their engagement on driving said driven part in a working direction by said driving part; stop means on both of said parts engageable by relative longitudinal movement therebetween for limiting the extent of engagement of said threads; and means releasably mounting one of said stop means on its corresponding part, whereby release of said one stop means will loosen tight engagement of said threads caused by driving said driven part by said driving part.

2. The structure defined in claim 1 in which the releasable mounting means includes screw means.

3. The structure defined in claim 1 in which the said one stop means comprises an annular member and including complementary, interfitting, coaxial, non-planar, annular surfaces on the said one part and on said member for centering the latter on the former.

4. In a power-driven rotatable tool, the combination comprising: a driving part rotatable about an axis; an exterior thread on said part concentric with said axis; a work-engaging driven part; an interior thread on said driven part complementary to and engageable with said driving part thread for detachably securing said parts together, said threads being of a direction to tighten their engagement on driving said driven part in a working direction by said driving part; stop means on both of said parts interengageable on relative longitudinal movement therebetween for limiting the extent of engagement of said threads; and means releasably mounting the driving part stop means on said driving part, whereby release of said driving part stop means will loosen tight engagement of said threads caused by driving said driven part by said driving part.

5. The structure defined in claim 4 wherein the releasable mounting means comprises screw means.

6. The structure defined in claim 4 wherein the driving part stop means comprises an annular member and including complementary, interfitting, coaxial, non-planar, annular surfaces on said driving part and on said stop means thereon for centering the latter on the former.

7. A shell cutter assembly comprising: a shell cutter having cutting teeth on the front end thereof and in interior thread at the rear end thereof; a cutter hub having an exterior thread about its periphery engaged with said shell cutter thread to detachably secure together said cutter and hub, said threads being of a direction to tighten their engagement on driving the assembly in a cutting direction; means on said hub for detachably mounting the latter on the end of a boring bar; and a ring releasably mounted on the rear face of said hub and extending radially outwardly beyond said hub thread into overlying engagement with said cutter rear end to limit the extent of engagement of said threads, whereby release of said ring will loosen tight engagement of said threads caused by cutting operation of the assembly.

8. The structure defined in claim 7 including screw means detachably securing the ring to the hub.

9. The structure defined in claim 7 in which the hub is provided with an exterior circumferential recess at the rear end thereof and adjacent the rear end of the hub thread, and the ring has a portion complementary to said recess for centering said ring on said hub.

10. The structure defined in claim 7 in which the rear face of the hub is provided with a central boss having an annular side surface, and the inner surface of the ring is complementary to and engaged with said boss surface to center said ring on said hub.

11. A shell cutter assembly comprising: a cutter hub; a shell cutter having the rear end thereof detachably secured to said cutter hub; a pilot drill disposed concentrically within said cutter and having its shank detachably threadedly engaged with said hub; and means on said hub separate from said shank for detachable driven engagement by a boring bar.

12. The structure defined in claim 11 in which the front face of the hub is provided with a central interiorly-threaded socket engaged with a complementary end of the drill shank, in which the drill projects beyond the front end of the cutter, and in which the drill is provided with wrench-engageable, flat side surfaces disposed forwardly beyond the plane of said cutter front end.

13. The structure defined in claim 11 in which the hub is provided with an interiorly-threaded central aperture having the drill shank projecting therethrough and threadedly engaged therewith, said shank having a shoulder thereon engaged against the front face of said hub, and in which said shank includes a non-circular, wrench-engageable portion projecting rearwardly of said aperture.

References Cited in the file of this patent

UNITED STATES PATENTS

| | | |
|---|---|---|
| 141,244 | Stockwell | July 29, 1873 |
| 396,177 | Smith | Jan. 15, 1889 |
| 468,420 | Rieger | Feb. 9, 1892 |
| 505,963 | Smith | Oct. 3, 1893 |
| 947,713 | Johnson | Jan. 25, 1910 |
| 1,105,535 | Roberts | July 28, 1914 |
| 1,341,067 | Naugle | May 25, 1920 |
| 1,441,994 | Mueller | Jan. 9, 1923 |
| 2,800,812 | Mueller et al. | July 30, 1957 |